United States Patent
Koyama

(10) Patent No.: US 10,793,702 B2
(45) Date of Patent: Oct. 6, 2020

(54) METHOD FOR MANUFACTURING MASTERBATCH, METHOD FOR MANUFACTURING TIRE RUBBER COMPOSITION, AND METHOD FOR MANUFACTURING TIRE

(71) Applicant: TOYO TIRE & RUBBER CO., LTD., Itami-shi, Hyogo (JP)

(72) Inventor: Shuhei Koyama, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 100 days.

(21) Appl. No.: 16/169,440

(22) Filed: Oct. 24, 2018

(65) Prior Publication Data
US 2019/0144640 A1    May 16, 2019

(30) Foreign Application Priority Data
Nov. 13, 2017 (JP) ................................. 2017-218318

(51) Int. Cl.
| | |
|---|---|
| *C08L 7/02* | (2006.01) |
| *C08K 3/04* | (2006.01) |
| *B60C 1/00* | (2006.01) |
| *C08K 5/09* | (2006.01) |
| *C08J 3/22* | (2006.01) |
| *C08K 5/098* | (2006.01) |
| *C08J 3/215* | (2006.01) |

(52) U.S. Cl.
CPC .................... *C08L 7/02* (2013.01); *B60C 1/00* (2013.01); *B60C 1/0016* (2013.01); *C08J 3/215* (2013.01); *C08J 3/226* (2013.01); *C08K 3/04* (2013.01); *C08K 5/09* (2013.01); *C08K 5/098* (2013.01); *C08J 2307/02* (2013.01); *C08L 2310/00* (2013.01)

(58) Field of Classification Search
None
See application file for complete search history.

(56) References Cited

U.S. PATENT DOCUMENTS

| | | | | | |
|---|---|---|---|---|---|
| 3,859,284 | A | * | 1/1975 | Formaini | C08G 18/4661 544/221 |
| 4,110,294 | A | * | 8/1978 | Pickering | C08K 5/34 525/421 |
| 4,110,364 | A | * | 8/1978 | Gaku | C08G 73/121 430/283.1 |
| 4,239,672 | A | * | 12/1980 | Zima | B05D 7/142 427/435 |
| 4,996,263 | A | * | 2/1991 | Pyke | C08G 81/028 525/178 |
| 2014/0124113 | A1 | * | 5/2014 | Miyazaki | C08K 13/02 152/451 |
| 2014/0128532 | A1 | * | 5/2014 | Nakamura | C08K 3/04 524/496 |
| 2014/0155541 | A1 | * | 6/2014 | Shirakawa | B60C 1/00 524/571 |
| 2019/0144640 | A1 | * | 5/2019 | Koyama | C08L 7/02 523/351 |

FOREIGN PATENT DOCUMENTS

| | | |
|---|---|---|
| JP | 2014-95019 A | 5/2014 |
| JP | 2014-95020 A | 5/2014 |

* cited by examiner

*Primary Examiner* — Peter A Salamon
(74) *Attorney, Agent, or Firm* — Westerman, Hattori, Daniels & Adrian, LLP

(57) ABSTRACT

A masterbatch manufacturing method comprises an operation in which rubber latex and a carbon black slurry containing a compound according to Formula (I), below, are mixed.

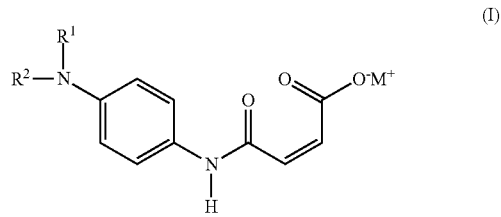

At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.

10 Claims, No Drawings

METHOD FOR MANUFACTURING MASTERBATCH, METHOD FOR MANUFACTURING TIRE RUBBER COMPOSITION, AND METHOD FOR MANUFACTURING TIRE

TECHNICAL FIELD

The present disclosure relates to a method for manufacturing masterbatch, method for manufacturing tire rubber composition, and method for manufacturing tire.

BACKGROUND ART

Patent Reference Nos. 1 and 2 disclose adding the compound (2Z)-4-[(4-aminophenyl)amino]-4-oxo-2-butene acid sodium to rubber and kneading this in a Banbury mixer, i.e., using dry kneading to cause this compound to be dispersed within rubber.

PRIOR ART REFERENCES

Patent References

PATENT REFERENCE NO. 1: Japanese Patent Application Publication Kokai No. 2014-95019
PATENT REFERENCE NO. 2: Japanese Patent Application Publication Kokai No. 2014-95020

SUMMARY OF INVENTION

Problem to be Solved by Invention

However, because this compound tends to flocculate and form flocculated clumps, it is difficult to cause this compound to be dispersed to a high degree within rubber when dry kneading is employed, and it is also difficult to cause this compound to react in highly homogeneous fashion at the surface of the carbon black when dry kneading is employed.

And yet, causing this compound to react in highly homogeneous fashion at the surface of the carbon black will permit improvement in wear resistance of vulcanized rubber.

It is an object of the present disclosure to provide a method for manufacturing masterbatch that will make it possible to improve the wear resistance of vulcanized rubber. It is another object of the present disclosure to provide a method for manufacturing a rubber composition that will make it possible to improve the wear resistance of vulcanized rubber. It is another object of the present disclosure to provide a method for manufacturing a tire.

Means for Solving Problem

A masterbatch manufacturing method in accordance with the present disclosure comprises an operation in which rubber latex and a carbon black slurry containing a compound according to Formula (I), below, are mixed.

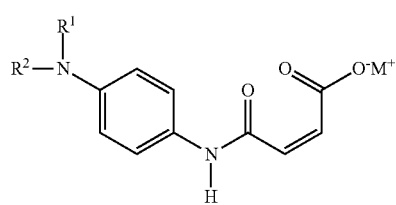
(I)

(At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

A tire rubber composition manufacturing method in accordance with the present disclosure comprises the masterbatch manufacturing method. That is, a tire rubber composition manufacturing method in accordance with the present disclosure comprises an operation in which rubber latex and a carbon black slurry containing a compound according to Formula (I) are mixed.

A tire manufacturing method in accordance with the present disclosure comprises the masterbatch manufacturing method. That is, a tire manufacturing method in accordance with the present disclosure comprises an operation in which rubber latex and a carbon black slurry containing a compound according to Formula (I) are mixed.

EMBODIMENTS FOR CARRYING OUT INVENTION

A masterbatch manufacturing method in an embodiment in accordance with the present disclosure comprises an operation in which rubber latex and a carbon black slurry containing a compound according to Formula (I), below, are mixed.

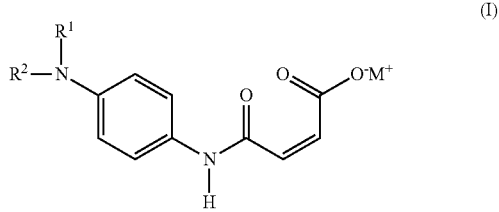
(I)

(At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

Employment of a masterbatch manufacturing method in an embodiment in accordance with the present disclosure will permit improvement in wear resistance of vulcanized rubber. Because this makes it possible for the compound according to Formula (I) to dissolve in the carbon black slurry, flocculation of the compound according to Formula (I) is suppressed at the carbon black slurry. As a result of such mixture of the carbon black slurry and the rubber latex, it is possible to cause the compound according to Formula (I) to react in highly homogeneous fashion at the surface of the carbon black. Employment of a masterbatch manufacturing method in an embodiment in accordance with the present disclosure will therefore permit improvement in wear resistance of vulcanized rubber.

First Embodiment

A first embodiment in accordance with the present disclosure is described below.

A tire manufacturing method in accordance with a first embodiment comprises an operation in which rubber latex and a carbon black slurry containing a compound according to Formula (I) are mixed to obtain pre-coagulation rubber latex; an operation in which the pre-coagulation rubber latex is coagulated to obtain a masterbatch; an operation in which at least the masterbatch and compounding ingredient(s) are kneaded together to obtain a mixture; an operation in vulcanizing-type compounding ingredient(s) are kneaded into the mixture to obtain a rubber composition and an operation in which an unvulcanized tire fabricated from the rubber composition is vulcanized and molded.

The tire manufacturing method in accordance with the first embodiment comprises an operation in which the carbon black slurry and rubber latex are mixed to obtain pre-coagulation rubber latex. The carbon black slurry and the rubber latex may be mixed using a high-shear mixer, homomixer, ball mill, bead mill, high-pressure homogenizer, ultrasonic homogenizer, colloid mill, and/or other such ordinary disperser.

The carbon black slurry comprises carbon black and a compound according to Formula (I). The carbon black slurry further comprises water. In the carbon black slurry, carbon black is dispersed in water. The carbon black slurry might, for example, be obtained by adding carbon black and the compound according to Formula (I) to water, and agitating this; or by adding carbon black to water, agitating this, adding the compound according to Formula (I) to this, and agitating this as necessary. As examples of carbon black, besides SAF, ISAF, HAF, FEF, GPF, and the like, acetylene black, Ketchen black, and/or other such electrically conductive carbon blacks may be used. The carbon black may be nongranulated carbon black or may be granulated carbon black that has been granulated based upon considerations related to the handling characteristics thereof. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %. It is preferred that the amount of the compound according to Formula (I) in the carbon black slurry be not less than 0.1 mass % per 100 mass % of the carbon black slurry, and more preferred that this be not less than 0.3 mass %. The upper limit of the range in values for the amount of the compound according to Formula (I) in the carbon black slurry is preferably 2.0 mass %, and is more preferably 1.0 mass %.

Formula (I) is indicated below.

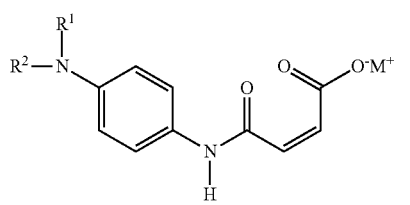

(I)

(At Formula (I), $R^1$ and $R^2$ each indicates a hydrogen atom, an alkyl group having 1 to 20 carbons, an alkenyl group having 1 to 20 carbons, or an alkynyl group having 1 to 20 carbons. $R^1$ and $R^2$ may be the same or different. $M^+$ indicates sodium ion, potassium ion, or lithium ion.)

The compound according to Formula (I) possesses coupling functionality, i.e., ability to cause linking to occur between rubber polymer and carbon black. More specifically, it is thought to make it possible for terminal nitrogen functional groups to bond to carbon black, and to make it possible for carbon-carbon double-bond portions to bond to rubber polymer. At Formula (I), it is preferred that $R^1$ and $R^2$ each be a hydrogen atom. It is preferred that $M^+$ be a sodium ion. It is preferred that the compound according to Formula (I) be a compound according to Formula (I'), below.

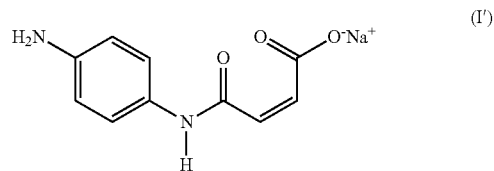

(I')

The rubber latex comprises rubber particles and water. In the rubber latex, rubber particles are dispersed in colloidal fashion in water. The rubber latex may comprise ammonia. The rubber latex might, for example, be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. Dry rubber content of the rubber latex might be not less than 10 mass %, or might be not less than 20 mass %, for example. The upper limit of the range in values for the dry rubber content of the rubber latex might, for example, be 60 mass %, 50 mass %, or the like.

The tire manufacturing method in accordance with the first embodiment comprises an operation in which the pre-coagulation rubber latex obtained as a result of mixture of the rubber latex and the carbon black slurry is coagulated to obtain a masterbatch. Coagulant may be added to the pre-coagulation rubber latex to cause it to coagulate. The coagulant might, for example, be an acid. As the acid, formic acid, sulfuric acid, and the like may be cited as examples. The coagulum obtained by coagulation of the pre-coagulation rubber latex contains water. This operation may comprise dewatering the coagulum and plasticizing it as it is dried. At this operation, an extruder may be used to cause dewatering of the coagulum by means of compaction and evaporation, plasticization thereof being carried out following dewatering as this is being dried. As the extruder, a single-screw extruder may be cited as an example. As a result of such procedure, masterbatch may be obtained.

The masterbatch comprises rubber, carbon black, and a compound according to Formula (I). The rubber might, for example, be natural rubber, isoprene rubber, butadiene rubber, styrene-butadiene rubber, nitrile rubber, chloroprene rubber, and/or the like. It is preferred that the amount of natural rubber in the masterbatch be not less than 70 mass %, more preferred that this be not less than 80 mass %, still more preferred that this be not less than 90 mass %, and still more preferred that this be 100 mass %, per 100 mass % of the rubber. For every 100 parts by mass of the rubber, it is preferred that the amount of carbon black in the masterbatch be not less than 10 parts by mass, more preferred that this be not less than 20 parts by mass, and still more preferred that this be not less than 30 parts by mass. For every 100 parts by mass of the rubber, it is preferred that the amount of carbon black in the masterbatch be not greater than 80 parts by mass, and more preferred that this be not greater than 60 parts by mass. For every 100 parts by mass of the rubber, the amount of the compound according to Formula (I) in the masterbatch might be not less than 0.05 part by mass. For every 100 parts by mass of the rubber, the amount of the compound according to Formula (I) in the masterbatch might be not greater than 10 parts by mass.

The tire manufacturing method in accordance with the first embodiment comprises an operation in which at least the masterbatch and compounding ingredient(s) are kneaded together to obtain a mixture. As the compounding ingredient(s), carbon black, zinc oxide, stearic acid, antioxidant, and/or the like may be cited as examples. Any one or a plurality may be chosen from there among and kneaded together with the masterbatch. If carbon black is added during kneading, as examples of such carbon black, besides SAF, ISAF, HAF, FEF, GPF, and the like, acetylene black, Ketchen black, and/or other such electrically conductive carbon blacks may be used. The carbon black may be nongranulated carbon black or may be granulated carbon black that has been granulated based upon considerations related to the handling characteristics thereof. The grade of any carbon black which may be added during kneading may be the same as or may be different from the grade of carbon black in masterbatch per ASTM (American Society for Testing and Materials). Addition of carbon black during kneading will make it possible to suppress adhesion of compounding ingredient(s) with respect to the kneader (e.g., if a Banbury mixer is used, adhesion of compounding ingredient(s) to chamber walls), and will permit improvement in assimilation of compounding ingredient(s) by the rubber. As examples of the antioxidant, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and the like may be cited. During this kneading operation, other rubber(s) may be kneaded therein together with the masterbatch and compounding ingredient(s). As rubber that may be added to the masterbatch during kneading, natural rubber, polyisoprene rubber, styrene-butadiene rubber, nitrile rubber, chloroprene rubber, and the like may be cited as examples. Kneading may be carried out using an internal mixer. As the internal mixer, Banbury mixers, kneaders, and the like may be cited as examples.

The tire manufacturing method in accordance with the first embodiment further comprises an operation in which a vulcanizing-type compounding ingredient is kneaded into the mixture to obtain a rubber composition. As the vulcanizing-type compounding ingredient, sulfur, organic peroxides, and other such vulcanizing agents, vulcanization accelerators, vulcanization accelerator activators, vulcanization retarders, and so forth may be cited as examples. As the sulfur, powdered sulfur, precipitated sulfur, insoluble sulfur, high dispersing sulfur, and the like may be cited as examples. As the vulcanization accelerator, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited as examples.

The rubber composition comprises rubber originating from the masterbatch. The amount of rubber originating from the masterbatch might be not less than 40 mass %, might be not less than 60 mass %, might be not less than 80 mass %, or might be 100 mass %, per 100 mass % of the rubber within the rubber composition, for example.

The rubber composition comprises a compound according to Formula (I). For every 100 parts by mass of rubber within the rubber composition, it is preferred that the amount of the compound according to Formula (I) be not less than 0.05 part by mass, more preferred that this be not less than 0.1 part by mass, still more preferred that this be not less than 1 part by mass, and still more preferred that this be not less than 2 parts by mass. The amount of the compound according to Formula (I) might, for example, be not greater than 10 parts by mass for every 100 parts by mass of rubber within the rubber composition.

The rubber composition comprises carbon black. For every 100 parts by mass of rubber within the rubber composition, it is preferred that the amount of carbon black be not less than 10 parts by mass, more preferred that this be not less than 20 parts by mass, and still more preferred that this be not less than 30 parts by mass. For every 100 parts by mass of rubber within the rubber composition, it is preferred that the amount of carbon black be not greater than 80 parts by mass, and more preferred that this be not greater than 60 parts by mass.

The rubber composition may further comprise stearic acid, zinc oxide, antioxidant, sulfur, vulcanization accelerator, and/or the like. It is preferred that the amount of the sulfur, expressed as equivalent sulfur content, be 0.5 part by mass to 5 parts by mass for every 100 parts by mass of rubber within the rubber composition. It is preferred that the amount of vulcanization accelerator be 0.1 part by mass to 5 parts by mass for every 100 parts by mass of rubber within the rubber composition.

The rubber composition may be used to fabricate a tire. More specifically, it is capable of being used to fabricate tire member(s) making up a tire; for example, it may be used to fabricate sidewall rubber, tread rubber, and/or the like, and it may in particular be favorably used to fabricate tread rubber.

The tire manufacturing method in accordance with the first embodiment comprises an operation in which an unvulcanized tire fabricated from the rubber composition is vulcanized and molded. The unvulcanized tire is provided with tire member(s) fabricated from the rubber composition.

First Variation

Whereas carbon black and a compound according to Formula (I) were for example added to water to obtain the carbon black slurry at the tire manufacturing method in accordance with the first embodiment, carbon black and a compound according to Formula (I) might be added to dilute rubber latex in accordance with a first variation. The dilute rubber latex might, for example, be obtained by adding water to rubber latex. The rubber latex used in fabricating the dilute rubber latex might, for example, be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. It is preferred that the dry rubber content of the dilute rubber latex be not less than 0.1 mass %, more preferred that this be not less than 0.2 mass %, and still more preferred that this be not less than 0.3 mass %. The upper limit of the range in values for the dry rubber content of the rubber latex might, for example, be 5 mass %, it being preferred that this be 2 mass %, and it being more preferred that this be 1 mass %.

Second Variation

Whereas carbon black was added to water, this was agitated, the compound according to Formula (I) was added to this, and this was agitated as necessary to obtain the carbon black slurry at the tire manufacturing method in accordance with the first embodiment, carbon black might be added to dilute rubber latex, this might be agitated, the compound according to Formula (I) might be added to this, and this might be agitated as necessary in accordance with a second variation. As the dilute rubber latex, that which was described at the first variation may be used.

WORKING EXAMPLES

Working examples in accordance with the present disclosure are described below.
Raw materials and reagents are indicated below.

| | |
|---|---|
| Natural rubber latex | NR Field Latex manufactured by Golden Hope (dry rubber content 31.2%) |
| Natural rubber | RSS #3 |
| Carbon black | "SEAST 9 (N110)" manufactured by Tokai Carbon Co., Ltd. |
| Compound 1 | "SUMILINK 200" manufactured by Sumitomo Chemical Co., Ltd.; (2Z)-4-[(4-aminophenyl)amino]-4-oxo-2-butene acid sodium (compound according to Formula (I')) |
| Zinc oxide | "Zinc Oxide No. 1" manufactured by Mitsui Mining |
| Stearic acid | "LUNAC S-20" manufactured by Kao Corporation |
| Antioxidant | "Antigen 6C" (N-phenyl-N'-(1,3-dimethylbutyl)-p-phenylenediamine) manufactured by Sumitomo Chemical Co., Ltd. |
| Sulfur | "5% Oil Treated Sulfur Powder" manufactured by Tsurumi Chemical Industry Co., Ltd. |
| Vulcanization accelerator | "Sauceler NS-G" manufactured by Sanshin Chemical Industry Co., Ltd. |

Fabrication of Rubber A

Compound 1 was added to natural rubber latex in an amount that was 3 parts by mass for every 100 parts by mass of the dry rubber content thereof, and this was spread out thinly on a tray and dried at room temperature to obtain Rubber A.

Fabrication of Wet Masterbatch A

Carbon black was added to water and agitated to fabricate a carbon black slurry containing 6 mass % of carbon black. The carbon black slurry and natural rubber latex were mixed in such fashion as to cause there to be 35 parts by mass of carbon black for every 100 parts by mass of the dry rubber content of the natural rubber latex to obtain a pre-coagulation rubber latex. Formic acid serving as coagulant was added to the pre-coagulation rubber latex in an amount sufficient to achieve a pH of 4 to obtain a coagulum. A Model V-02 screw press (squeezer-type single-screw dewatering extruder) manufactured by Suehiro EPM Corporation was used to dewater the coagulum, and plasticization was carried out as this was dried, to obtain Wet Masterbatch A.

Fabrication of Wet Masterbatch B

Carbon black and Compound 1 were added to water and agitated to fabricate a carbon black slurry containing 6 mass % of carbon black and 0.5 mass % of Compound 1. The carbon black slurry and natural rubber latex were mixed in such fashion as to cause there to be 35 parts by mass of carbon black and 3 parts by mass of Compound 1 for every 100 parts by mass of the dry rubber content of the natural rubber latex to obtain a pre-coagulation rubber latex. Formic acid serving as coagulant was added to the pre-coagulation rubber latex in an amount sufficient to achieve a pH of 4 to obtain a coagulum. A Model V-02 screw press (squeezer-type single-screw dewatering extruder) manufactured by Suehiro EPM Corporation was used to dewater the coagulum, and plasticization was carried out as this was dried, to obtain Wet Masterbatch B.

Fabrication of Unvulcanized Rubber

The compounding ingredients except for sulfur and vulcanization accelerator were added to rubber in accordance with TABLE 1, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Wear Resistance

The unvulcanized rubber was vulcanized at 150° C. for 30 min, and Lambourn abrasion testing (slip rate 30%; load 40 N; falling abradant rate 20 g/min) was carried out in accordance with JIS K 6264 to measure amount lost due to abrasion. At TABLE 1, values of reciprocals of amounts lost due to abrasion for the respective examples are shown indexed relative to a value of 100 for that of Comparative Example 1. The higher the index the more excellent the wear resistance.

TABLE 1

| | | Comparative Example 1 | Comparative Example 2 | Working Example 1 |
|---|---|---|---|---|
| Amount blended therein (parts by mass) | Rubber A | — | 103 | — |
| | Wet Masterbatch A | 135 | — | — |
| | Wet Masterbatch B | — | — | 138 |
| | Carbon black | 17 | 52 | 17 |
| | Compound 1 | 3 | — | — |
| | Zinc oxide | 2.5 | 2.5 | 2.5 |
| | Stearic acid | 2.5 | 2.5 | 2.5 |
| | Antioxidant | 1.5 | 1.5 | 1.5 |
| | Sulfur | 1.8 | 1.8 | 1.8 |
| | Vulcanization accelerator | 1.8 | 1.8 | 1.8 |
| Wear resistance | | 100 | 100 | 111 |

Wear resistance of the vulcanized rubber at Working Example 1 was superior to that of Comparative Example 1. It is thought that Compound 1 was better able to react in highly homogeneous fashion at the surface of the carbon black at Working Example 1 than at Comparative Example 1.

Wear resistance of the vulcanized rubber at Working Example 1 was superior to that of Comparative Example 2. It is thought that there was more Compound 1 that was assimilated into the natural rubber latex and was unable to react with the carbon black in the masterbatch of Comparative Example 2 than there was in the masterbatch of Working Example 1.

The invention claimed is:

1. A masterbatch manufacturing method comprising an operation in which rubber latex and a carbon black slurry comprising a compound according to Formula (I) are mixed;

wherein Formula (I) is given by

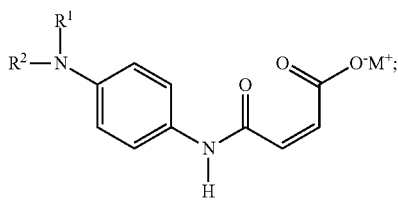

and
wherein, at Formula (I), $R^1$ and $R^2$ each indicates a hydrogen atom, an alkyl group having 1 to 20 carbons, an alkenyl group having 1 to 20 carbons, or an alkynyl group having 1 to 20 carbons;
$R^1$ and $R^2$ may be the same or different; and
$M^+$ indicates sodium ion, potassium ion, or lithium ion.

2. The masterbatch manufacturing method according to claim 1 wherein the rubber latex and the carbon black slurry are mixed to obtain pre-coagulation rubber latex at the operation, further comprising an operation in which the pre-coagulation rubber latex is coagulated to obtain the masterbatch.

3. The masterbatch manufacturing method according to claim 1 wherein the carbon black is present in the carbon black slurry in an amount that is 1 mass % to 15 mass % per 100 mass % of the carbon black slurry.

4. The masterbatch manufacturing method according to claim 1 wherein the compound is present in the carbon black slurry in an amount that is not less than 0.1 mass % per 100 mass % of the carbon black slurry.

5. The masterbatch manufacturing method according to claim 1 wherein the compound is present in the carbon black slurry in an amount that is not less than 0.1 mass % to 2.0 mass % per 100 mass % of the carbon black slurry.

6. The masterbatch manufacturing method according to claim 1 wherein the compound is a compound according to Formula (I');
wherein Formula (I') is given by

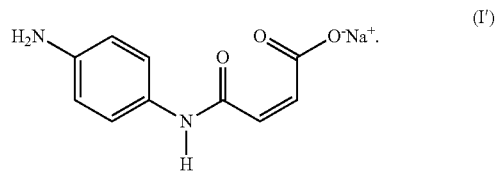

7. The masterbatch manufacturing method according to claim 1 wherein the rubber latex comprises natural rubber latex.

8. The masterbatch manufacturing method according to claim 1 wherein dry rubber content of the rubber latex is 10 mass % to 60 mass %.

9. A tire rubber composition manufacturing method comprising an operation in which the masterbatch manufacturing method according to claim 1 is used to manufacture the masterbatch.

10. A tire manufacturing method comprising an operation in which the masterbatch manufacturing method according to claim 1 is used to manufacture the masterbatch.

* * * * *